May 12, 1925.
F. B. OLSON
1,537,132
SPEED CONTROL FOR MOTOR DRIVEN SYSTEMS
Filed Jan. 2, 1920 4 Sheets-Sheet 1
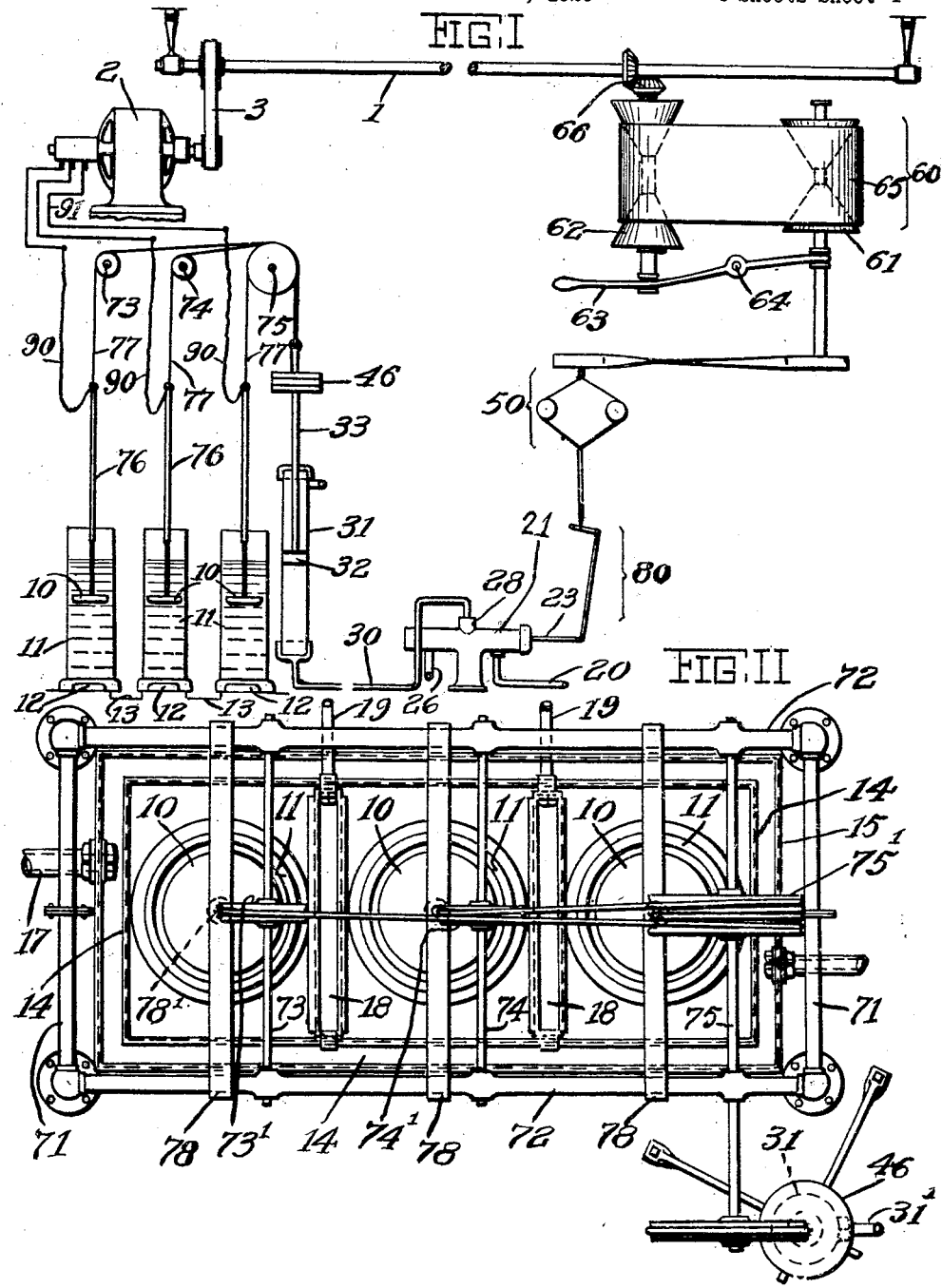
Inventor
Frederick B. Olson
By Ellis Spear Jr.
Attorney

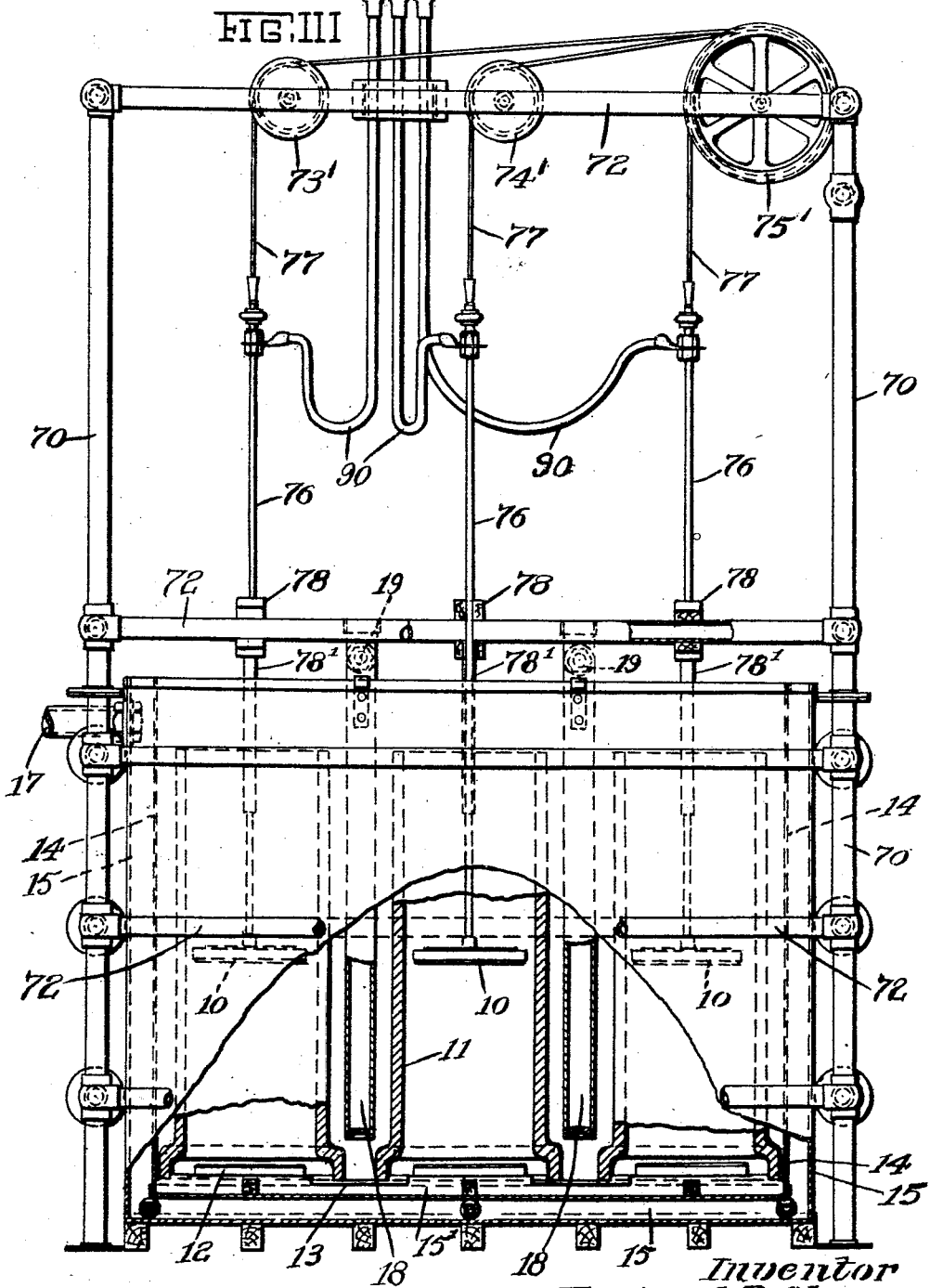

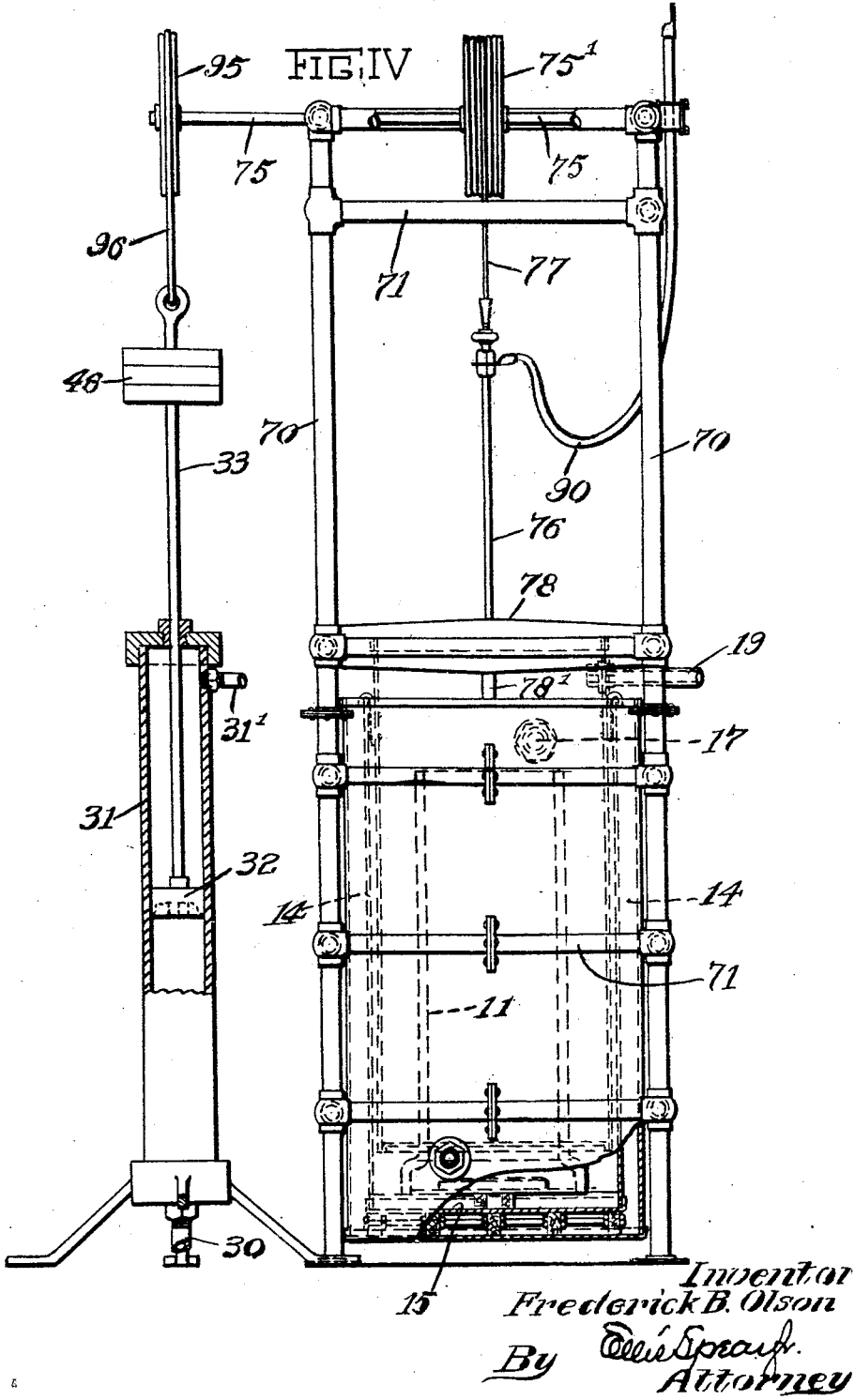

May 12, 1925.
F. B. OLSON
SPEED CONTROL FOR MOTOR DRIVEN SYSTEMS
Filed Jan. 2, 1920 4 Sheets-Sheet 4
1,537,132
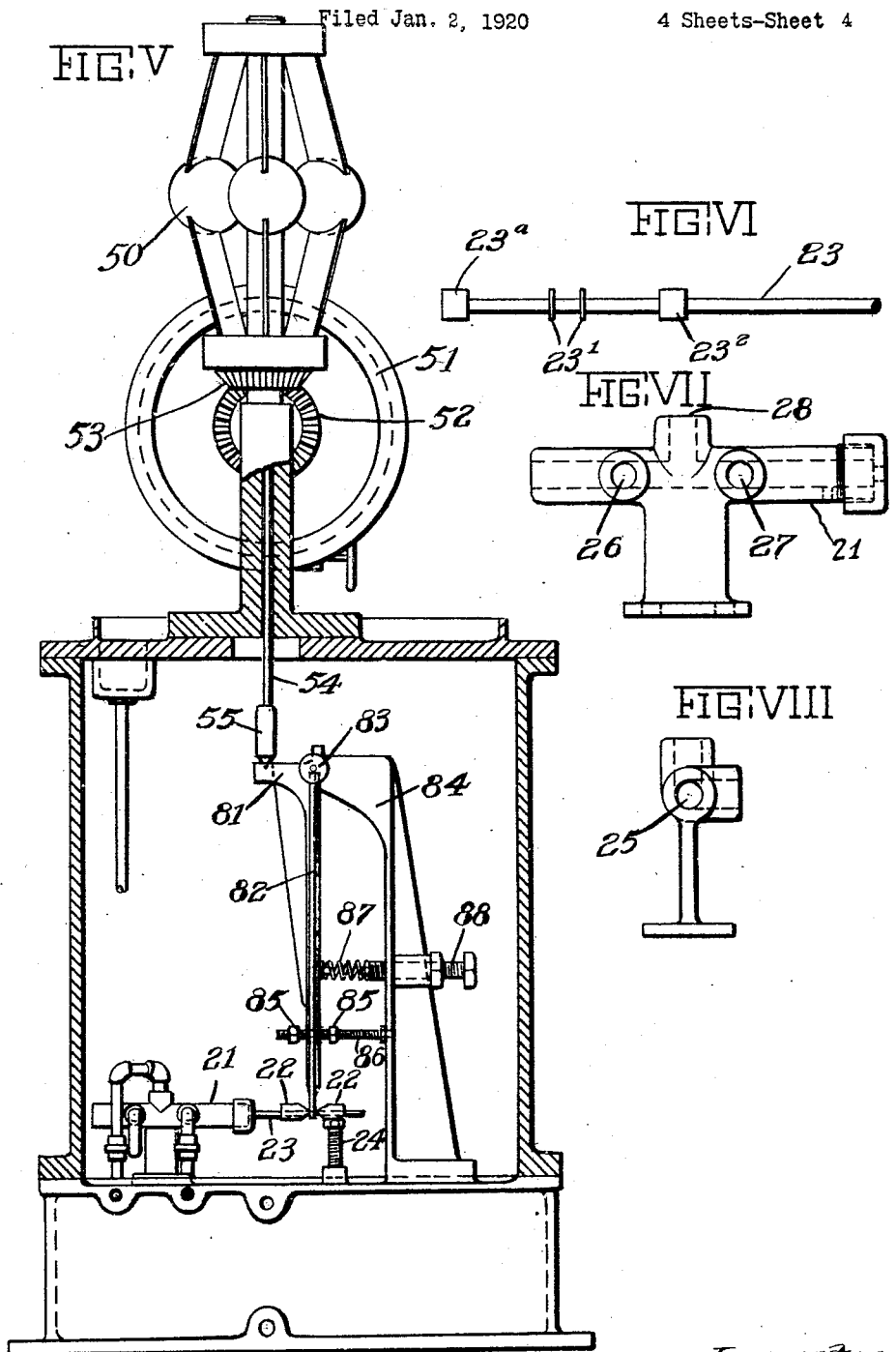
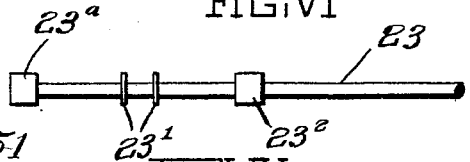
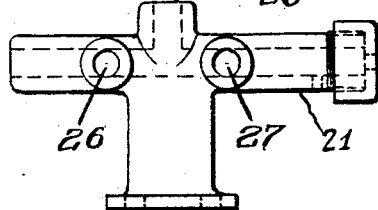
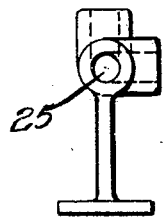
Inventor
Frederick B. Olson
By
Attorney Patented May 12, 1925.

1,537,132

UNITED STATES PATENT OFFICE.

FREDERICK B. OLSON, OF BERLIN, NEW HAMPSHIRE.

SPEED CONTROL FOR MOTOR-DRIVEN SYSTEMS.

Application filed January 2, 1920. Serial No. 348,978.

*To all whom it may concern:*

Be it known that I, FREDERICK B. OLSON, a citizen of the United States, residing at Berlin, county of Coos, State of New Hampshire, have invented certain new and useful Improvements in Speed Controls for Motor-Driven Systems, of which the following is a specification.

This invention relates to electric control systems and particularly to speed controls for alternating current motors. While capable of a great variety of application to different types of work, my invention is of greatest importance in connection with mechanisms or groups of mechanisms in which the control of the speed of the motor is of prime importance. In some instances it is essential that a drive be maintained at some predetermined speed at which the mechanism must be run to produce a given product. In other instances it is essential that speed be varied to maintain some other factor constant. In such cases as require that the driven mechanism be maintained at fixed speed, any variation in load must be met in the motor as for example where paper making machines are being electrically driven. In other instances, as in the case of an electrically driven pump it is frequently necessary to reduce the volume without raising the pressure so that it is desirable to slow the pump rather than to cut down the rate of delivery with its concomitant rise in pressure.

The application of my invention to the drive of a paper making machine is of practical importance and well adapted to illustrate the principles of my invention. Without any intention therefore of limiting my invention to such use, I shall discuss it particularly with reference to paper making, and for the purpose of illustration of apparatus especially adapted to that purpose.

Throughout the specification and drawings like reference characters are employed to indicate corresponding parts, and in the drawings:

Fig. I is a diagrammatic view of a control system in accordance with my invention.

Fig. II a plan view of the electric motor control.

Fig. III a side elevation of the same partly in section.

Fig. IV an end view also partly in section.

Fig. V a detail view of the pressure regulating unit, and

Figs. VI, VII and VIII details of the valve constructions of such unit.

Referring to diagrammatic view, Fig. I, I have indicated at 1 a main drive shaft which for the purposes of discussion may be understood to be the drive shaft of a gang of paper making machines. The shaft 1 is driven by a motor 2 through suitable belting 3. The motor 2 may be of any standard type of alternating current motor with a rotor having a polyphase winding.

In paper making the speed in the wire and drums must be kept as nearly uniform as possible, uniformity of product being entirely dependent upon the maintenance of accurate speed under all conditions.

For example, in a characteristic set up the single shaft 1 usually drives the Fourdrinier driers, calendars, reels and rewinders.

In the fourdriniers the wire must be run accurately and uniformly, any variations immeditaely affecting the thickness of the paper. Variations in the thickness of the paper are serious factors both as affecting the suitability of the paper for the purpose specified and the amount of the paper. In other words, variation in thickness results in variance both in the weight of the ream and the number of reams in the roll.

The slightest variation in thickness of the paper in the presses increases the load in these machines and adds another varying factor in the total load on the motor.

The driers in like manner contribute to the variation in load on account of friction resulting from shrinkage of the paper in passing through. The calendars also require more or less power according to the amount of friction and variations in the paper. The variation in the driving of the reel is practically continuous. As the rolls build up or are renewed there are wide fluctuations in the load on the motor.

Furthermore, and in addition to all these factors which together produce a complicated variation of very considerable degree, there is the intermittent load of the rewinding reels which are thrown in operation from time to time as the rolls of paper are formed from the reels of the main machine.

From the foregoing it will be apparent that in order to maintain the necessary uniform speed in the machines, it is necessary that the common driving shaft for all the machines be maintained at a fixed speed regardless of the fluctuations in load in any and all parts of the entire gang or of the current from which the motor is run. This means that the system of control must be very sensitive so as to immediately respond to any retardation or acceleration in the machines.

In my invention I accomplish this accommodation preferably through a system of speed governed, pressure operated, fluid rheostatic control of the current in the rotor on the motor.

Referring again to Fig. I, I provide as the controlling element for the current of my motor or motors if more than one is used on the same drive, an electric control consisting essentially of a series of electrodes 10 isolated in cells 11 over electrodes 12 which are bonded by conductors 13 from cell to cell. Each of the suspended electrodes is electrically connected to one of the windings of the rotor. This electric control is capable of extreme delicacy of adjustment coupled with great freedom of movement to meet sudden or wide variations.

My invention therefore contemplates a manipulation of my control by a medium of equal flexibility and constance and responsive at once to the slightest tendency of the main shaft to retard or speed. I provide at 20 a suitable source of fluid pressure preferably a water supply. This supply is controlled by a three-way valve 21 communicating through pipe 30 to a cylinder 31 in which is a piston 32 on a stem 33 weighted preferably as at 46. The piston 32 as indicated in Fig. I controls the plane of suspension of the electrodes 10 as will be hereinafter described. From the main shaft 1 I drive a governor 50 through suitable connection. This connection 60 shown in diagrammatic view, Fig. I, may for the present preliminary survey be entirely disregarded. The governor 50 through a bell crank 80 and the valve 21 effects a continuous readjustment of the pressure of the cylinder 31 so as to maintain within the cells 10 the necessary ohmic resistance to balance the current against the demands made upon the motor by variation in load.

Bearing in mind therefore that the main shaft 1 is to be maintained at a certain predetermined R. P. M. it will be seen that any variation of load on it modifies the demand on the motor 2. With an adequate current the motor 2 always has potentially sufficient power to meet any demand made upon it by given installation. The problem is therefore one of permitting the motor to give immediate satisfaction to the demand by a variation in its power so as not to alter the speed of the shaft.

For this purpose I provide my electric control heretofore mentioned and which I will now describe more in detail.

The cells 11 heretofore mentioned are of non-porous insulating material set within a tank 14 which contains the electrolyte. Any suitable electrolyte may be used, but I find calcium chloride highly satisfactory for this purpose. The tank 14 is jacketed as at 15, this jacket being connected by pipes 16 and 17 for suitable circulation to maintain the proper temperature in the tank and prevent the evaporation of the electrolyte. I also preferably suspend within the electrolyte tank cooling cells 18 piped at 19 for circulation. The tank 14 is supported by an enclosing tubular frame work comprising uprights 70 and suitably spaced laterals 71. The uprights 70 are carried up beyond the top of the tank a convenient distance and connected by horizontal members 72. Across the laterals 72 are three shafts 73, 74 and 75 on which are journalled a series of pulleys $73^1$, $74^1$ and $75^1$. These pulleys are so disposed as to present a working edge in central vertical alinement with the cells 11.

The movable electrodes 10 are carried on rods 76 which are in turn suspended by suitable cords 77 which pass over their respective pulleys. The suspension cords passing over the pulleys $73^1$ and $74^1$ are turned about the pulley $75^1$ which is triple grooved and acts as a common winding drum for the three suspension systems for the movable electrodes. The stems 76 which bear the electrodes 10 pass through guides 78 set in transverse pieces 79. Held within the guides 78 are porcelain insulating tubes $78^1$ each extended down into a cell 11 so as to prevent the passage of current through the electrolyte across the mouths of the cells 11 from one cell to another.

In the bottom of each of the cells is disposed the fixed electrode 12 preferably in the form of a flat disc, the adjacent cells having their fixed electrodes connected as at 13 by a strip of copper. The cells 11, the electrodes 12, and conductors 13 are spaced from the floor of the tank 14 by suitable frame work 15 which keeps them out of contact with the bottom of the tank 14 and affords a space within which any sediment may accumulate without interference of the function of the electrodes. The cells 11 therefore while immersed in a common tank by reason of insulators $78^1$ afford electric isolation of each of the movable electrodes 10.

Each one of the stems 76 is connected by a flexible copper cable 90 to one of the leads 91 of the rotor windings of the motor 2. The shaft of the pulley 75¹ is extended as shown in Fig. IV and carries on its end a pulley 95 on which is turned a suspension cord 96. The stem 97, stem 33 and counter weight 46 are thus hung by the cord 96 on the pulley 95.

Within the cylinder 31 is the piston 32 carried at the lower end of the stem 33. The cylinder is vented at 31¹ to permit the escape of any air or water which might pass the piston 32. Fluid admitted to the piston through the pipe 30 will therefore float the counterweight 46 at any predetermined height, thus regulating the plane of suspension in which the electrodes 10 are to be maintained relative to the fixed electrodes 12.

The governor 50 driven from the pulley 51 and the bevelled gears 52 and 53 is provided with a vertically reciprocating thrust rod 54. This rod is footed at 55 with point bearing on the short arm 81 of a bell crank lever 82, pivoted at 83 in a pocket 84, threaded on a stem 86. The long arm 82 is yieldingly sustained against the governor in its desired vertical adjustment by a backing spring 87 adjusted through a follower 88.

The lower end of the long arm 82 projects between opposed bearings 22 on the valve stem 23, one of said bearings resting upon and being guided by the flat top of the adjusting post 24. The valve casing 21 has a cylindrical bore 25 pierced by three ports 26, 27 and 28. These ports are respectively connected with the waste pipe 26, with the pressure pipe 20 and the lead pipe 30 to the operating cylinder 31. On the valve stem 23 are a pair of valve discs 23¹ adapted to be disposed when the valve is in neutral position opposite the port 28. On each side of the valve discs 23¹ are guiding and balancing plugs 23² so disposed on the valve stem 23 as to lie beyond the ports 26 and 27 when the valve is in the central or neutral position. So constructed, this valve is balanced as to pressure and is operable with a minimum of friction. The ratio of the lever arms 81 and 82 of the bell crank is such as to multiply the slightest variation in the governor 50 so as to give the necessary movement of the valve stem 23 to effect either the admission of pressure to the pipe 30 or the venting of the pipe 30 through the pipe 26¹.

It may be noted at this point that when the valve 23 is moved inward or to the left of the casing as it appears in Fig. VII, it uncovers the port 28 and permits the flow of fluid entering the port 27 direct to the line 30. When the valve stem is withdrawn shifting the valve 23¹ to the right past the port 28, the line 30 is vented and is relieved through the port 26. When in neutral or central position the two valve discs 23 isolate the port 28 from either supply or vent and hold the fluid charge of the cylinder 31 under its piston 32 so as to maintain the counter weight 46 thus maintaining the electrodes at the desired level.

In driving my governor 50 I preferably connect this up with the main shaft through a variable speed control 60. This control of a well known type comprises two cone pulley pairs 61 and 62 adjustable towards and away from each other by a lever 63 pivoted at 64. The pulley pairs are belted as at 65 and the device driven from the main shaft 1 as by metal pinions 66. This change speed device is important in that it permits the governor to be readily set to control the motor so that the shaft 1 will be maintained at any predetermined speed regardless of the normal speed of the motor. This takes care of a considerable degree of variation in the motor and its belting and in all those varying conditions which are incidental to running an installation of this sort. In case a motor breaks down any other motor within reasonable limits may be substituted or other parts of the mechanism may be replaced without the necessity of having especially made parts and permitting all the time the set of the system for a predetermined rate of speed. While this change speed unit therefore is really an important and practical element in my system, it is not to be misunderstood as having anything to do with the continuous adjustment which is almost continuously in the electric control of the motor to maintain the shaft 1 at its predetermined speed. The variable speed device 60 being once set at the desired R. P. M. may be ignored as a factor in the variable speed control of the motor and the maintenance of the shaft 1 at a constant R. P. M.

From the foregoing it will now be seen how it is possible that the rotation of the shaft 1 may be so constantly maintained. In installations already made in accordance with my invention, carefully kept records show sustained runs at variations as low as one percent. Under most extreme and abusive shifts in load my system has held up the drive to variations of only a few per cent and those variations have been hardly more than momentary. This is against former ordinary fluctuations ten times as great and which seriously affected the weight of paper and made expensive stoppages and adjustments necessary.

The counter balanced electrode floated on an easily variable fluid pressure makes possible an instant response within the motor itself to any tendency to variations in the shaft 1.

Various modifications may obviously be made in the different elements of my system and the elements shown or other elements substituted therefor may be combined in various manners, all without departing from the spirit of my invention if within the limits of the appended claim.

What I therefore claim and desire to secure by Letters Patent is:

The combination with a driven element and an electric motor having a polyphase winding, of a secondary liquid rheostat comprising a relatively movable and a relatively stationary electrode for each winding, a common support for the movable electrodes, a governor, a variable speed mechanism interposed between said governor and the driven element, and motion transmitting connections dominated by said governor and dominant upon said common support for the movable electrodes of the rheostat whereby to simultaneously vary the position of all of said movable electrodes upon a variation of the surface speed of said driven element.

In testimony whereof I affix my signature in presence of two witnesses.

FREDERICK B. OLSON.

Witnesses:
VICTORIA LOWDEN,
MARION F. WEISS.